Figure 3:
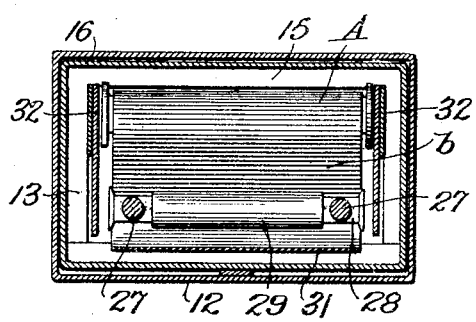

No. 781,393. PATENTED JAN. 31, 1905.
J. M. BRAINERD.
DAYLIGHT ROLL FILM DEVELOPING APPARATUS.
APPLICATION FILED MAR. 7, 1904.
2 SHEETS—SHEET 1.
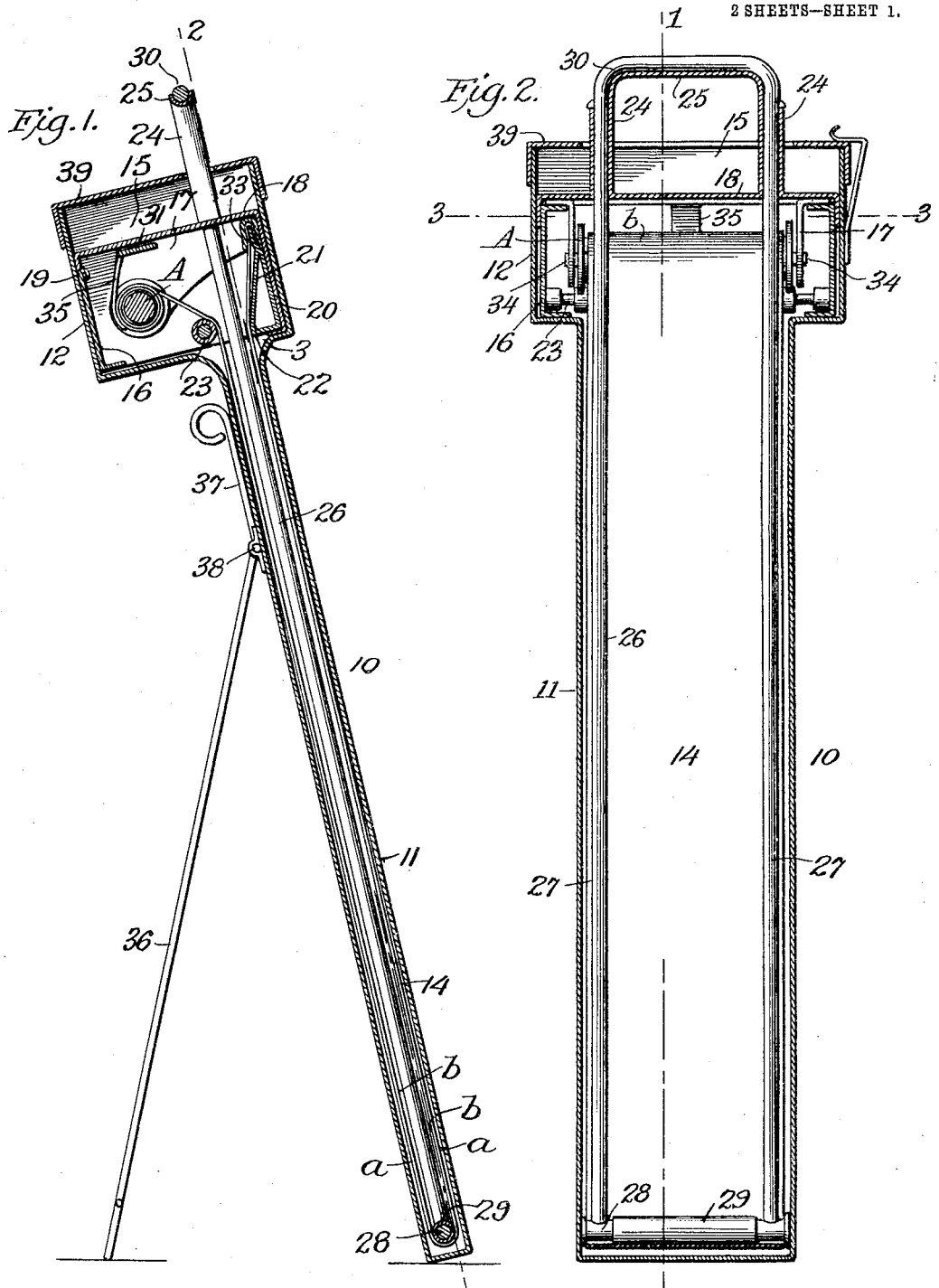
Witnesses
James F. Duhamel,
V. E. Nichols
J. Millard Brainerd, Inventor
By his Attorneys
Griffin, Beukard & Cavanagh No. 781,393. PATENTED JAN. 31, 1905.
J. M. BRAINERD.
DAYLIGHT ROLL FILM DEVELOPING APPARATUS.
APPLICATION FILED MAR. 7, 1904.

2 SHEETS—SHEET 2.

Witnesses
James F. Duhamel,
V. E. Nichols.

Inventor
J. Millard Brainerd
By his Attorneys
Griffin Bernhard & Cavanagh

No. 781,393. Patented January 31, 1905.

UNITED STATES PATENT OFFICE.

J. MILLARD BRAINERD, OF ROME, NEW YORK.

DAYLIGHT ROLL-FILM-DEVELOPING APPARATUS.

SPECIFICATION forming part of Letters Patent No. 781,393, dated January 31, 1905.

Application filed March 7, 1904. Serial No. 196,901.

*To all whom it may concern:*

Be it known that I, J. MILLARD BRAINERD, a citizen of the United States, residing at Rome, in the county of Oneida and State of New York, have invented certain new and useful Improvements in Daylight Roll-Film-Developing Apparatus; and I do hereby declare the following to be a full, clear, and exact specification of the same.

This invention relates to a daylight roll-film-developing apparatus for use by photographers and others in the development and the necessary treatment of sensitized photographic films subsequent to their exposure without resorting to a dark room.

In the present invention I have provided a simple and compact form of apparatus which, consisting of a few parts, is cheap of manufacture, can be packed or stored in a small space, easily carried from one place to another, and is economical in the use of developing and fixing fluids.

Provision is made in my apparatus for placing the roll-film or cartridge in the bath or solution without exposing the sensitized surface to the actinic rays of light, and the film under treatment may have movement imparted thereto for the purpose of securing smooth development, or it may remain at rest in a very dilute developing solution to allow the film to remain quiescent for a certain period—say an hour or so—for complete development similar to the practice followed in what is known as the "tank" or "stand" system of development.

Broadly stated, my invention contemplates the employment of one or a plurality of reciprocatory members or elements embodied, preferably, in the form of a plunger or plungers mounted or arranged to traverse a film-spool compartment and adapted to double the film in two or more lengths upon itself and to carry said lengths of the film from one roll or cartridge into a bath or solution that is contained in a subjacent treatment chamber or reservoir, whereby the plunger or plungers may be operated subsequent to placing the cartridge in the apparatus to immerse two or more lengths of a doubled film into a bath without exposing the sensitized surface to light.

My apparatus can be used to good advantage in connection with short or "six-exposure" cartridges now in favor with the camera trade and users, because the apparatus is small and compact. The apparatus for roll-cartridges of this class is supplied with a single plunger which is adapted to double the film as it is drawn from the cartridge-spool and to move such doubled length of film into the bath, whereby the length of the treatment-chamber is required to be approximately one-half the total length of the cartridge-film, thus materially reducing the size of the apparatus and securing a compact portable structure which requires a comparatively small volume of solution in the treatment of the film. The plunger or plungers and the supporting devices for the cartridge are so arranged and related that the plunger or plungers are adapted in their endwise movement to engage with the back of the film or with the paper backing with which the cartridge-film is supplied. This prevents the plunger or plungers from engaging directly with or defacing the sensitized surface of the film, and said plunger or plungers also lie between the lengths of the doubled film, so as to mechanically separate or space them, thus providing for free and quick access by the liquid to all parts of the film under treatment. In connection with the cartridge-spool chamber I employ means for holding the free or otherwise unconfined end of the film and the backing therefor, while the cartridge-spool is mounted to rotate freely in said chamber, thus permitting the film to unwind when it is engaged by the reciprocatory member or plunger that becomes effective in doubling the film upon itself and in carrying the lengths thereof into the treatment-chamber. The cartridge containing or spool chamber is also equipped with means by which the rapid and undesirable unwinding tendency of the paper backing from the cartridge-film is checked, thus overcoming the too free movement of the paper backing into the treatment-chamber and causing said backing to lie substantially parallel to the film in order to prevent the backing from pressing against the film in the treatment-chamber, which otherwise might have a tendency to bulge out the film and press its sensitized surface against the walls of said chamber.

Further objects and advantages of the invention will appear in the course of the subjoined description, and the actual scope thereof will be defined by the annexed claims.

Reference is to be had to the accompanying drawings, forming a part of this specification, wherein like characters of reference are used to indicate corresponding parts in all the figures.

Figure 4:
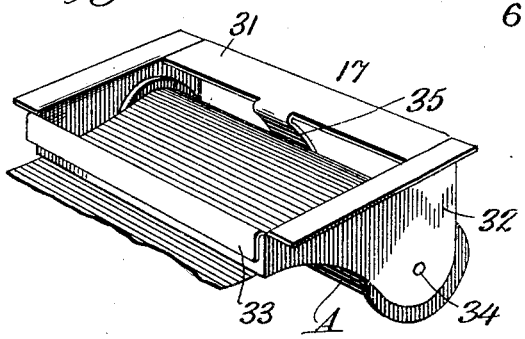
Figure 5:
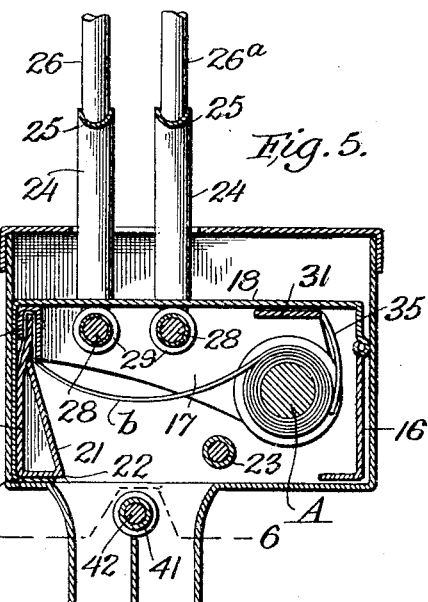
Figure 6:
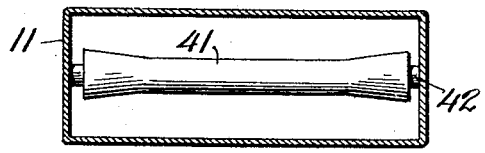
Figure 7:
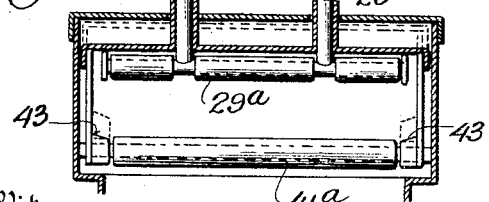

Figure 1 is a vertical longitudinal sectional view through a daylight roll-film-developing apparatus constructed in accordance with one embodiment of my invention, the plane of the section being indicated by the dotted line 1 1 of Fig. 2. Fig. 2 is a similar sectional view at right angles to Fig. 1 and taken in the plane of the dotted line 2 2 of Fig. 1. Fig. 3 is a sectional view, the plane of the section being indicated by the dotted line 3 3 of Fig. 2. Fig. 4 is a detail perspective view of the cartridge-spool holder and the film-clamp removed from the apparatus. Fig. 5 is a vertical longitudinal section through another embodiment of the invention, wherein a plurality of plungers are employed to fold or double a film two or more times and to carry the same into a bath of the tank. Fig. 6 is a detail cross-section on the line 6 6 of Fig. 5, showing one form of guide-roller adapted to engage with a sensitized surface of a film without injury thereto. Fig. 7 is a detail cross-sectional view through a form of apparatus wherein a plurality of plungers may be used and devices are provided for lifting the sensitized surface of the film off the dividing-roller.

I will first proceed to describe the apparatus shown by Figs. 1 to 3, inclusive, of the drawings, which represent one embodiment of the invention that is especially adapted for the development and treatment of that kind of roll-film cartridges known to the art as "short films" or "six-exposure" cartridges, owing to the fact that it is of such a length as to contain enough film for making six exposures when used in a camera. 10 designates a casing which consists of a lower section or member 11 and an upper member 12, the same being made of any suitable material and of any desired form and size. As shown, the lower member 11 is quite long and narrow, the width thereof being sufficient to accommodate a film of standard size. The upper member 12 of the casing is larger than the lower member 11, so as to produce a shoulder or ledge 13 between the two members, although the parts may be rounded or curved, as shown by the drawings. The member 12 provides a long narrow treatment-chamber 14, and it may be made of opaque material, such as metal, or of translucent or semitransparent material, such as celluloid or glass, suitably colored to overcome transmission of the actinic rays of light and permit the operator to observe the process of development by transmitted light. The upper member 12 of the casing provides a compartment 15, adapted to receive means for holding a roll-film and means for clamping an end portion of such film.

I provide a spool-holder 17, having means for mounting the spool of a film-cartridge revolubly therein, and this holder is adapted to coöperate with a film-box 16 in a way to clamp or hold an end portion of the film between the film-box and the spool-holder. The film-box is open at the bottom, but is closed at its top, sides, and ends, and said film-box is arranged to have a snug fit in the chamber 15 in order to rest on the shoulder or ledge 13 in a way to prevent the passage of light-rays through the chamber 15 and into the treatment-chamber 14, thus preventing the sensitized surface of the film from becoming affected by the light-rays. The film-box is free to have a limited slidable movement in the compartment 15, and, as shown, this box has a top 18, which is hinged or pivoted at 19 to an end or side wall of the box. The top may be locked in a closed condition on the box by any suitable form of fastener—such, for example, as the spring-latch 20. The film-box is provided with an internal wall 21 within one end thereof, said wall being inclined, as shown by Fig. 1, and producing a shoulder 22, that is adapted to serve as a guide for a film and its backing when they are carried by the movement of the plunger from the spool-chamber into the treatment-chamber. In the lower part of the film-box is mounted another guide 23, preferably in the form of a friction-roller, the same being spaced with relation to the shoulder 22 and arranged parallel therewith, thus leaving an opening between the shoulder and the roller through which a doubled film is adapted to be moved. To the top 18 of the film-box is secured a guide 24, which extends upwardly from the top and is preferably in the form of a loop or bail, thus making the member 24 serve as a handle in raising or lowering the film-box and as a guide for a plunger to be presently described. The legs of the guide or handle are hollow, as shown by Fig. 2, and the upper part of said guide is cut away and fashioned to produce a seat 25 for the handle of the plunger.

The plunger 26 is shown as consisting of the side rods 27, a cross-piece 28, a roller 29 on said cross-piece at the lower end of the plunger, and a handle 30 at the upper portion of the plunger. The side bars or rods of the plunger are fitted slidably in the hollow legs of the guide and handle to permit the plunger to have free movement in the guide, and when the plunger is lowered its full distance, so as to pass through the film-box and the spool-holder and into the treatment-chamber, the handle 30 of the plunger fits snugly in the seat of the handle or guide, as shown by Fig. 2. The side rods of the plunger are fastened rigidly to the cross-piece 28, while the roller or sleeve 29 is fitted on the cross-piece between the rods to turn freely thereon when the plunger is lowered and has frictional engagement with the paper backing or the back side of the film.

Although I have shown and described a particular form of plunger which is adapted for use with the other parts of the apparatus as contemplated by this invention, I do not strictly confine myself to any special form of plunger.

The spool-holder 17 is shown more clearly by Fig. 4 of the drawings in the form of a skeletonized frame having a flanged top plate 31 and the depending lugs or sides 32, the whole being made of metal, so as to give to the sides or ears a certain degree of elasticity which permits them to be spread slightly in order to introduce the spool of the roll-film into the holder. The top plate 31 of the holder has a large opening therein, and one of the side bars of the holder is doubled or folded upon itself to produce a clamping-flange 33, which extends downwardly, as shown. The sides or ears 32 are provided on their opposing faces with pintles or studs 34, that are adapted to fit in the usual recesses or sockets which are provided in the end portions of the film-spool A. To prevent the paper backing $b$ of the film $a$ from unwinding freely after the spool is fitted in the holder, I provide a brake or stop 35, which is in the form of a curved spring that is integral with or attached to the top plate 31 at the middle portion thereof, said brake or stop being arranged to have frictional engagement with the paper backing of the film and being effective in securely holding the film and the backing in a rolled-up condition. The spool-holder is constructed to fit snugly in the film-box to assume the position shown more clearly by Fig. 1, wherein the clamping-flange 33 fits over an edge portion of the film-box, so as to coöperate therewith in firmly holding a free or unconfined edge portion of the paper backing across the film-box and the path of the plunger.

The apparatus is intended to remain in an upright position during the treatment of the film, and any suitable means may be employed for supporting or holding the same— such, for example, as means for fastening the casing on an edge portion of a table, &c. As shown by the drawings, however, the apparatus is equipped with a leg or standard 36, which is provided with an angular end 37, said leg being hinged or pivoted at 38 to the casing at a suitable point below the upper enlarged member 12 thereof. The leg may be turned outward to bring the angular end 37 against the casing, and the apparatus stands on the lower end of the casing and the leg in a slightly-inclined position, as shown by Fig. 1, although this is not essential.

In using my invention the plunger is lifted until its cross-piece engages with the under side of the hinged top 18, and the latch 20 is then released to allow the hinged top to be thrown back to an open position, thus exposing the spool-holder to access. The film-box having been withdrawn from the member 12, the plunger raised, and the top 18 lifted to an open position, access can be obtained easily to the spool-holder for the purpose of withdrawing it from the film-box. The cartridge in a rolled-up condition is now slipped into position between the sides or ears of the spool-holder from the under side thereof, and the pintles of this holder slip or spring into the sockets of the spool, the sides or ears of the holder yielding sufficiently for the cartridge-spool to pass the pintles. An end portion of the paper backing is now withdrawn from the cartridge, the spool of which turns freely on the pintles; but not enough of the backing is withdrawn to expose the film. The backing thus withdrawn extends across the spool-holder, substantially as shown by Fig. 4, and the spring brake or stop of the holder engages frictionally with the cartridge to prevent the film and the backing from unwinding. The holder, with the cartridge therein, is now placed in the film-box and the end portion of the backing is gripped between the clamping-flange of the holder and an edge portion of the film-box, whereby one end of the film-backing is held across the path of the plunger. (See Fig. 3.) When the film-box and the spool-holder are placed in the upper compartment 15 of the casing, the plunger takes the raised position shown by Fig. 5 of the drawings, and the film-box coöperates with the shoulder 13 in a way to prevent the passage of the actinic rays of light into the treatment-chamber. The developing solution may now be poured into the upper compartment 15 of the casing, and it finds its way around the film-box into the treatment-chamber. The plunger is now pressed downwardly from the raised position so as to pass through the spool-holder and the film-box and enter the treatment-chamber. The initial downward movement of the plunger causes the roller to engage with the paper backing, and as one end of the backing is held by the clamping-flange the continued downward movement of the plunger acts on the backing and the film to unwind the same from the cartridge-spool and to carry the film and the backing downwardly into the treatment-chamber, thereby subjecting the film to the action of the developing solution. When the plunger is fully lowered into the treatment-chamber, the handle of said plunger engages with the seat 25 of the guide, thus arresting the downward movement of said plunger. The apparatus may be held in an upright position by the leg or by any suitable means, and it may remain at rest for any desired length of time, particularly if a weak developing solution is employed to secure slow development of the sensitized surface of the film in accordance with the "tank" or "stand" system of development. On the other hand, the film-box and the plunger may be given a reciprocatory movement by the operation of the hand which grasps the handle or guide 24, and in this event a cover 39 should be placed over the upper end of the member 12 to exclude light-rays from the treatment-chamber on the upward movement of the film-box away from the shoulder 13. The use of this cover may be dispensed with when the plunger and the film-box are at rest. On the downward movement of the film and its backing with the plunger one side of the film rides against the roller 23, while the other side of the film rides against the shoulder 22, whereby the sensitized surfaces of the doubled length of film are prevented from engaging with the opposing walls of the treatment-chamber. The roller at the lower part of the plunger engages with the back side of the film or with the backing, and this plunger serves to separate or space the lengths of the doubled film, thus allowing the developing solution to have free access to the film. The treatment-chamber, the plunger, and the film holding and clamping devices are so arranged and proportioned that the film will be fully withdrawn and immersed in the solution of the tank when the plunger is lowered, and this plunger also performs the function of holding the film and the backing in a taut condition to prevent buckling thereof and to overcome engagement of the sensitized sides of the film with the walls of the treatment-chamber.

A practical advantage of the spring brake or stop 35 resides in its ability to prevent too rapid unwinding of the backing and the film during the operation of depressing the plunger, thus preventing the stiff paper backing from pressing against the film to make its sensitized surface engage the walls of the treatment-chamber.

The operation of reciprocating the film-box and the plunger with the film in the treatment-chamber imparts smooth development to the film when it is desired to secure quick development thereof.

After the film shall have been developed the operator can invert the apparatus in order to pour off the solution. The device can now be restored to its proper position and a quantity of water can be introduced into the treatment-chamber, after which the water can be poured off and a fixing solution introduced into the chamber to complete the treatment of the film. Of course the condition of the film under treatment may be ascertained quite readily by looking through the transparent member 11 of the casing. The film-box and the plunger may be withdrawn from the apparatus when the treatment is completed, and the film, with its backing, can easily be removed from the spool-holder and the film-box.

In the embodiment of the invention shown by Figs. 5 and 6 of the drawings I have shown an apparatus which contemplates the employment of a plurality of plungers in connection with the casing, the film-box, and the spool-holder, each of said parts being constructed and arranged for operation substantially as hereinbefore described. This type of apparatus is especially well adapted for use on longer film-cartridges, which are designed for twelve or more exposures, but by duplicating the parts and increasing the size of the apparatus more than two plungers may be used for still longer films. The member 11 of the casing has its treatment-chamber divided into separate compartments by a longitudinal partition 40, and at the upper end of this partition is arranged a horizontal guide-roller 41, the latter being journaled on a suitable pin 42, fixed in the casing or fitted removably therein. The film-box 16 is fitted for movement in the upper compartment of the casing, and said box is provided with two or more guides 24 for the plungers 26 26$^a$, said plungers being disposed for movement in paths on opposite sides of the roller 41 in order that the plungers may work individually in the separate compartments of the treatment-chamber. The spool-holder 17 is disposed to remain in a fixed position in the film-box for movement therewith, and this holder has the pintles for revolubly supporting the cartridge-spool A and the flange 33 for gripping the free end of the film-backing. After the cartridge shall have been placed in the holder, the latter placed in the film-box, and the parts fitted in the casing the solution may be introduced into the treatment-chamber. The plungers 26 26$^a$ may now be depressed, and the film and its backing are unwound from the spool. The initial downward movement of the film with the plungers causes the film to engage with the roller 41, and the two plungers carry with them the doubled lengths of the film into the separate compartments of the treatment-chamber, whereby two doubled lengths of film are drawn from the spool and transferred to the baths in the treatment-chamber. It is evident that the solution may be poured off from the chamber after development is finished, that water may be introduced to wash the film and then poured off, and finally the fixing-bath can be introduced without removing the film and the plungers from the casing. It will be noted that the roller 41 lies in the path of the film for engagement with the sensitized side thereof, and to limit the area of this engagement between the roller and said side of the film I prefer to make the roller with enlargements 41ª at the end portions thereof. When the film is carried downward with the plungers, the enlargements of the roller have engagement with the sensitized side of the film at the edge portions thereof, and the roller is thus prevented from marring or defacing the exposed sensitized surface of the film.

In Fig. 7 of the drawings I have shown means for lifting the film above the dividing-roller 41ª when the film-box, the spool-holder, and the plungers are reciprocated vertically, whereby that part of the film which engages with the roller may be exposed to access by the bath or solution. As shown, the film-lifting devices are embodied in the form of curved flanges or ledges 43, which are provided on the inner opposing sides of the film-box at the lower open portion thereof. The roller 41ª is supported in the chamber 15 at a point quite close to the position assumed by the film-box when lowered, and the flanges or shoulders 43 are curved to fit snugly to or around the arbor of the roller 41ª, as shown. The plungers, the film-box, and the spool-holder may be moved vertically, and on the upward movement of the parts the ledges 43 lift the bight of the film above the roller 41ª, thus allowing the solution or bath to have free access to that part of the film which otherwise rests on the roller.

The plungers 26 26ª may be depressed simultaneously or successively; but, as shown by the drawings, the plungers are independent one of the other, and they are intended to be depressed successively—that is, the plunger 26 is first forced down to draw the film from the spool and across the roller 41 and thereafter the plunger 26ª is pressed down to engage the film stretched between the spool and the roller 41—thereby carrying two doubled lengths of film into the compartment of the treatment-chamber.

Changes in the form, minor details of construction, size, and proportion of parts may be made without departing from the spirit or sacrificing the advantages of my invention. I therefore reserve the right to make such alterations as fairly fall within the scope of the invention as defined by the annexed claims.

Having thus fully described my invention, what I claim as new, and desire to secure by Letters Patent, is—

1. A daylight film-developing apparatus, having a treatment-chamber, a light-tight film-box, means for holding a roll-film in said box, and means for transferring a doubled length of film from said box to said chamber.

2. A daylight film-developing apparatus having a treatment-chamber, a film-box movable with respect to said chamber, and means for moving a doubled length of film from said box into said chamber.

3. A daylight film-developing apparatus having a treatment-chamber, a film-box movable with respect thereto, and a plunger arranged to be moved with said box and capable of an independent movement across the same and into the treatment-chamber.

4. A daylight film-developing apparatus having a treatment-chamber, a light-tight film-box having means for holding a film, said box being removable from registration with the chamber, and a plunger arranged to move through the film-box and the treatment-chamber.

5. A daylight film-developing apparatus having a treatment-chamber, a film-box, and a film-transferring plunger mounted in said film-box.

6. A daylight film-developing apparatus having a treatment-chamber, a film-box in registration with said chamber and movable with respect to the same, said box being removable, and a film-transferring device mounted in said film-box.

7. A film-developing apparatus having a spool-chamber and a treatment-chamber in communication one with the other, the length of the latter chamber exceeding that of the former chamber, means for holding a roll-film in said spool-chamber, and means for transferring a doubled or folded length of film from the spool-chamber into the long narrow treatment-chamber.

8. A film-developing apparatus having a spool-chamber, and a treatment-chamber in communication one with the other, means for holding a roll-film in said spool-chamber, means for holding an end portion of said film, and means adapted to move between the film holding and clamping means for doubling or folding a portion of the film back upon itself.

9. A film-developing apparatus having a treatment-chamber, a spool-chamber in communication with the treatment-chamber, means for holding an end portion of the roll-film across the spool-chamber, and means for doubling a film and moving it into the treatment-chamber.

10. A film-developing apparatus having a treatment-chamber, and a spool-chamber in communication one with the other, a roll-film holder in the spool-chamber, and a plunger for doubling a film on itself and moving it from the spool-chamber into the treatment-chamber.

11. A film-developing apparatus having a treatment-chamber, a light-tight film-box removable from said treatment-chamber, and a film-transferring device reciprocable with said box, and arranged to be moved therethrough into the treatment-chamber.

12. A film-developing apparatus having a treatment-chamber and an enlarged compartment, a movable film-box in said compartment, and a film-doubling device movable with said film-box.

13. A film-developing apparatus having a treatment-chamber, a light-tight film-box, and a film-plunger arranged to traverse said film-box and to transfer lengths or strips of a doubled film from said box into the treatment-chamber.

14. A film-developing apparatus having a film-chamber, a treatment-chamber, means for holding in the film-chamber an end portion of a film in an extended position, and a plunger arranged to engage with the back side of a film and to space lengths or strips of the film in the treatment-chamber.

15. A film-developing apparatus having a film-chamber, a treatment-chamber, means for holding an end portion of a roll-film, and a plunger movable into both chambers and effective in separating lengths of a roll-film in the treatment-chamber.

16. A film-developing apparatus having a treatment-chamber and an enlarged compartment producing a shoulder or ledge, a film-box occupying said compartment and disposed opposite to the shoulder therein, and means for transferring a film from said box to the treatment-chamber.

17. A film-developing apparatus having a treatment-chamber, a film-box movable relatively to said chamber, and a plunger fitted to said box and movable therewith.

18. A film-developing apparatus having a treatment-chamber, a film-box, a spool-holder in said box, and a plunger arranged to traverse the box and the treatment-chamber.

19. A film-developing apparatus having a treatment-chamber, a spool-holder having means for clamping an end portion of a film, and a plunger arranged to pass through the spool-holder.

20. A film-developing apparatus having a treatment-chamber, a movable film-box, a spool-holder fitted to said box and movable therewith, and means for transferring a film from the box to said chamber.

21. A film-developing apparatus having a treatment-chamber, a movable film-box, a spool-holder fitted in said box for movement therewith, means for clamping an end portion of a film, and a plunger arranged to pass through the box.

22. A film-developing apparatus having a treatment-chamber, and an upper compartment, means for holding a roll-film in said compartment, a plunger, and a guide at one side of the path of the plunger for directing a film into the treatment-chamber.

23. A film-developing apparatus having a long narrow treatment-chamber and an enlarged upper compartment and a shoulder between said chamber and the compartment, a film-box occupying said compartment and coöperating with the shoulder to exclude the passage of light-rays into the treatment-chamber, and film-transferring devices.

24. A film-developing apparatus having a casing provided with a treatment-chamber, means for supporting said casing in an upright position, means for supporting a roll-film over said chamber, and a film-transferring device.

25. A film-developing apparatus having a treatment-chamber, a movable film-box having a guide, and a plunger slidably fitted to the guide and adapted to pass through the film-box into the chamber.

26. A film-developing apparatus having a treatment-chamber, a film-box fitted removably to said treatment-chamber, and a skeletonized plunger slidable through the film-box into the treatment-chamber.

27. A film-developing apparatus having a divided treatment-chamber and a film-compartment in communication with said chamber, means for holding an end portion across said film-compartment, and a plurality of plungers arranged to pass through a film-compartment and to enter the compartments of the treatment-chamber.

28. A film-developing apparatus having a treatment-chamber, a partition therein, a guide adjacent to the partition, a film-box disposed over the treatment-chamber, and plungers arranged to pass through said film-box and spaced to travel in paths on the respective sides of the partition.

29. A film-developing apparatus having a divided treatment-chamber, a film-box adjacent to an end portion of the treatment-chamber and having means for holding and clamping a roll-film, and a plurality of plungers movable across the film-box and into the compartments of the treatment-chamber.

30. A film-developing apparatus having a treatment-chamber, a guide across the mouth of the chamber, a film-box adjacent to an end portion of said treatment-chamber, and a plurality of plungers mounted in said box to traverse the same and movable in paths on the respective sides of the guide.

31. A film-developing apparatus having a treatment-chamber, a movable film-box, a guide-roller across the mouth of the chamber and adjacent to the film-box, and plungers movable across the film-box and on the respective sides of the guide-roller.

32. In a film-developing apparatus, a film-holder having means for revolubly supporting a roll-film, and a lock arranged to act on the roll-film and to arrest unwinding thereof.

33. In a film-developing apparatus, a film-box having means for revolubly supporting a roll-film, and means for clamping an end portion of a film to said box.

34. A film-developing apparatus having a treatment-chamber, a movable film-box, a film-holder fitted removably to said box and having means coöperating with a part of the box for clamping an end portion of a film, and a plunger arranged to traverse the film-box and enter the chamber.

35. A film-developing apparatus having a treatment-chamber, a roller with enlarged ends across the mouth of said chamber, and means for holding a film, and a plurality of plungers.

36. A film-developing apparatus having a treatment-chamber, a film-box having means for holding a film, and a plurality of plungers, the latter being independent of each other and adapted to be actuated successively.

37. A film-developing apparatus having a treatment-chamber, a film-box, a plurality of plungers, a roller, and means for lifting a film from said roller.

38. A film-developing apparatus having a treatment-chamber, a film-box, and means whereby a film may be transferred from said box to said chamber and while said film is contained in said chamber it may be given a reciprocatory agitating movement therein.

39. A film-developing apparatus having a treatment-chamber, a film-box, and a plunger arranged to transfer a film from said box to said chamber and adapted to be operated for giving a reciprocating movement to the film while it is held in a taut condition and worked in the chamber.

In testimony that I claim the foregoing as my own I hereunto sign my name in the presence of two witnesses.

J. MILLARD BRAINERD.

Witnesses:
J. MILDRED BRAINERD,
FLORENCE A. VREDENBURG.